United States Patent
Antonini et al.

[11] Patent Number: 5,454,183
[45] Date of Patent: Oct. 3, 1995

[54] BIRD REPELLING ARTICLE

[76] Inventors: Alvio D. Antonini; Jean Antonini, both of 514 Carpenter Ave., Iron Mountain, Mich. 49801

[21] Appl. No.: 125,861

[22] Filed: Sep. 24, 1993

[51] Int. Cl.⁶ .................................................. A01M 29/00
[52] U.S. Cl. ................................................ 43/1; 43/58
[58] Field of Search .................... 43/1, 58, 66; 52/101; 116/22 A

[56] References Cited

U.S. PATENT DOCUMENTS

| | | | |
|---|---|---|---|
| 2,142,371 | 1/1939 | Peles | 43/1 |
| 3,393,468 | 7/1968 | Wood et al. | 43/66 |
| 4,449,316 | 5/1984 | Moorhead | 43/58 |

FOREIGN PATENT DOCUMENTS

| | | | |
|---|---|---|---|
| 4-229124 | 8/1992 | Japan | 52/101 |

*Primary Examiner*—Kurt Rowan
*Attorney, Agent, or Firm*—John P. Halvonik

[57] ABSTRACT

The invention is a resilient article for preventing the nesting of birds. The article comprises a resilient base member and two sections of wire mesh that are joined to each end of the base. The wire sections may interlock with one another along a line running above the centerline of the base member. The base of the article may be bent or other wise deformed around other structures in order to set up the bird repeller. The base member may be imprinted with the indicia of a bird, such as an owl, in order to further deter the roosting of birds.

4 Claims, 1 Drawing Sheet

BIRD REPELLING ARTICLE

BACKGROUND OF THE INVENTION

1. Field of the Invention

The invention relates to the field of bird repelling devices and in particular to those bird repelling devices that are designed to be attached to static structures to prevent birds such as pigeons from roosting thereon. Oftentimes, pigeons or other birds roost in places near the home factories and businesses etc. where they are not wanted. It is found that using an upraised wire device with a deformable base allows such a device to be set up in a great variety of places such as trees, roofs etc.

2. Description of the Prior Art

While there are devices in the prior art that use upraised wires to prevent the roosting of birds, none that applicant is aware of are deformable to allow the device to be set up in a great variety of places, such as trees, roofs, etc. Nor is applicant aware of any such device that uses a representation of the face or eyes of a predator, such as an owl, to further scare the birds and prevent them from roosting.

SUMMARY OF THE INVENTION

The invention is a resilient article for attachment to various areas to prevent the roosting of birds such as pigeons, etc. The article comprises a resilient base member and two sections of deformable wire mesh that are joined to the ends of the base. The sections movable in relation to the base and are preferably connected to one another along a line running above the centerline of the base member. The base member may be deformed in order that the device may be conformed around other structures for set up. The base member may be imprinted with the indicia of a bird such as an owl in order to further deter birds.

It is an object of the invention to provide a bird repelling device that may be used in a variety of places such as trees, roofs, etc.

Another objective is to provide a bird repelling device that will deter pigeons through the use of upraised wire portions.

Another objective is to provide a bird repelling device that includes a representation of an owl in order to prevent birds from roosting.

Yet another objective is to provide a bird repelling article that may be deformed for positioning in trees, ledges, roofs, etc.

Other advantages of the invention will be readily apparent to those skilled in the art once the invention has been described.

DESCRIPTION OF THE PREFERRED EMBODIMENT

Figure 1:
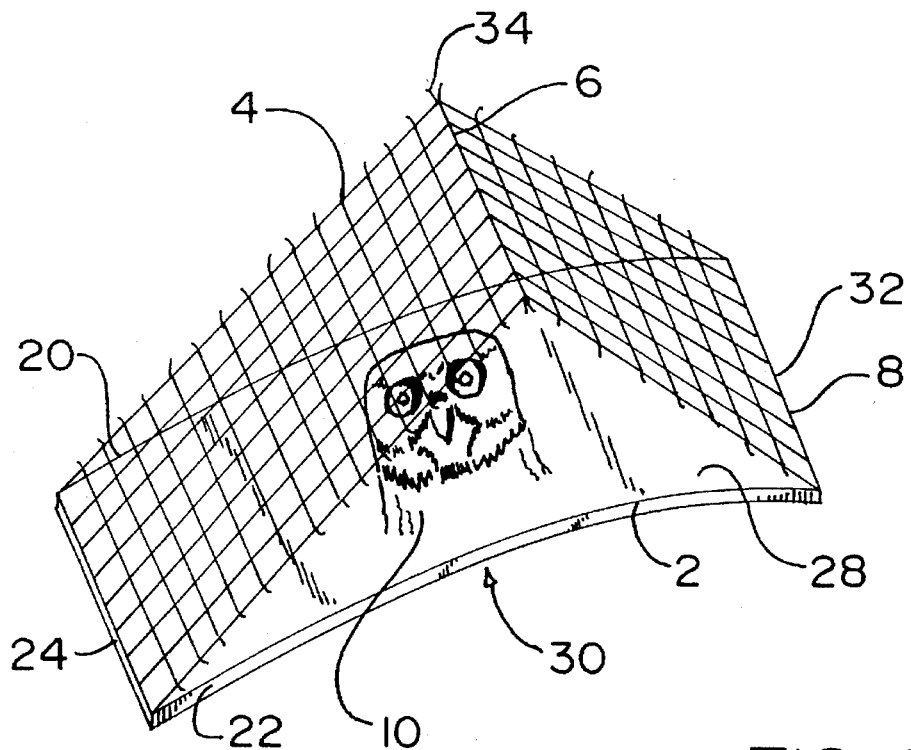
FIG. 1 shows the overall construction of bird repelling apparatus.

The overall construction of the article is shown in FIG. 1. The base portion 2 is made of deformable material and is preferably about 6" long and about 4" wide. Other dimensions are also possible. The right and left sides of the base are shown as 20 and 22 respectively. Opposite ends 8, 24 of the base are connected to bottom edges 32 of wire mesh portions 4 which are generally of planar construction. These may be rested, flat, upon the base for ease in transporting the articles. The upper surface 28 of the base may also be covered with the image 10 of a bird of prey, such as an owl, in order to further scare the birds and keep them from roosting. This image should be on the upper surface as shown, i.e. that surface that is facing the upraised wire sections. The image should be of a predator, such as an owl. It is thought that the eyes of the owl image may be slightly exaggerated in order to enhance the effect. The bottom surface of the base is indicated by arrow 30.

Figure 2:
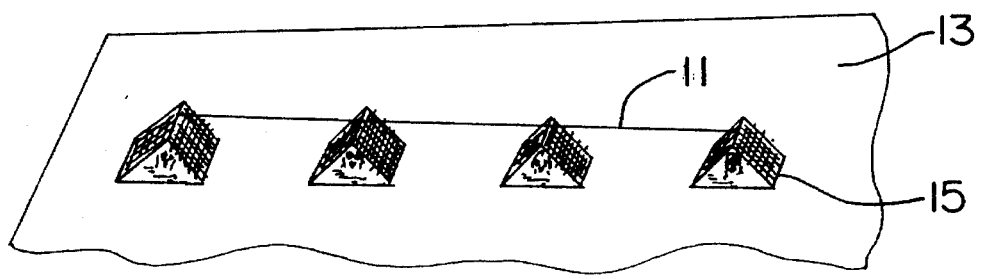
FIG. 2 Shows apparatus in use on a roof.

To use the article on flat surfaces e.g. flat roofs or ledges, the base member may be glued e.g. with caulking compound or otherwise attached to the roof. Use of this method eliminates the need to make permanent marks in the roof from nails, bolts, screws, etc. A series of such articles may be attached to a surface 13 at, say 6' or 8' intervals and connected across the top by a wire, see FIG. 2. A wire network 11 can be used to connect a series of such repellers 15. Strength is provided by the tension of the wire mesh on the wire. On wood or other soft surfaces, the base member is preferably attached by a nail or can be wired down, other methods are also possible.

The wire mesh sections may be pivoted upward and away from the ends of the base where each wire section is attached. Both sections are brought up and may be joined to one another by allowing them to lean upon each other along their top edges 6. The ends of each wire section may also be interlocked with one another to support them in the upraised position.

The wire sections present an upraised series of exposed wire ends 34 in connection with edge 6 as seen in FIG. 1 that deters birds from landing. The use of the deformable base allows the base to be bent around tree limbs, for instance. The base member of the article may be connected to the structure through the use of glue, staples, etc. The deformability allows the article to be placed in a wide variety of places that are of uneven or non-uniform surface.

The wire sections may be joined to the base by, for example, gluing, heating, stapling, or by use of slots in the base and a portion of the wires interlocked through the slots. Other methods are possible without varying from the spirit of the invention.

The wire portions are preferably made of wire mesh. It is preferred that the base should be made of granulated roofing paper or other such deformable material. Metal, carpet roofing or wire mesh may also be used for the base. The use of roofing paper allows for a weather resistant article that may be used on roofs or other areas. Other deformable, and weather resistant materials are possible for the base without varying from the spirit of the invention.

I claim:

1. A bird deterrent article comprising: a deformable base member having left and right sides, first and second wire mesh sections, each of said sections of planar shape and having a top edge and a bottom edge and a series of exposed wire ends, each of said bottom edges connected to one of said left and right sides of said base member so that said top edges of said wire mesh sections may be joined to one another along a line above said base so as to present said series of exposed wire ends to deter birds from roosting.

2. The article of claim 1 wherein said base member has a top surface and a bottom surface, said top surface having owl face indicia.

3. The apparatus of claim 1 wherein said base member is about 6" long and about 4" wide.

4. The apparatus of claim 1 wherein said base is made of granulated roofing paper.

* * * * *